Oct. 6, 1936.  R. E. HANDFORD  2,056,923
APPARATUS FOR DELIVERING MEASURED QUANTITIES OF LIQUID
Filed Aug. 26, 1931  8 Sheets-Sheet 4

Inventor
Reuben E. Handford
By his attorneys,

Oct. 6, 1936.  R. E. HANDFORD  2,056,923
APPARATUS FOR DELIVERING MEASURED QUANTITIES OF LIQUID
Filed Aug. 26, 1931   8 Sheets-Sheet 5
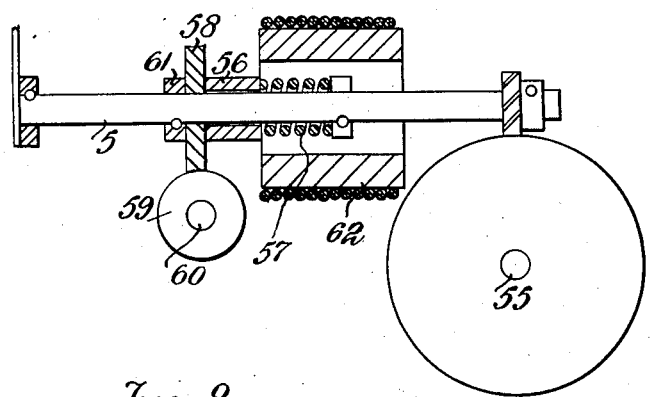
Fig. 7.
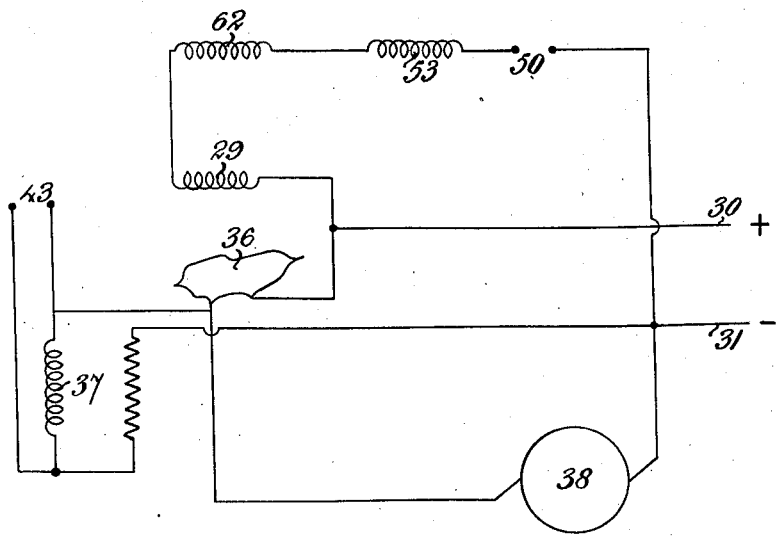
Fig. 8.
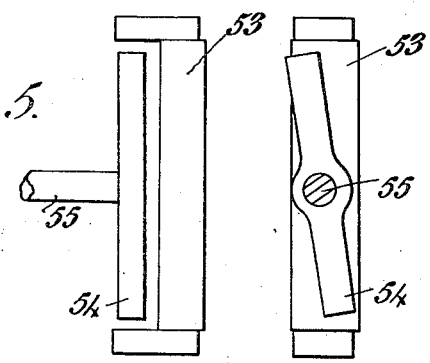
Fig. 6.
Fig. 5.
Inventor
Reuben E. Handford
By his attorneys
Baldwin & Wight

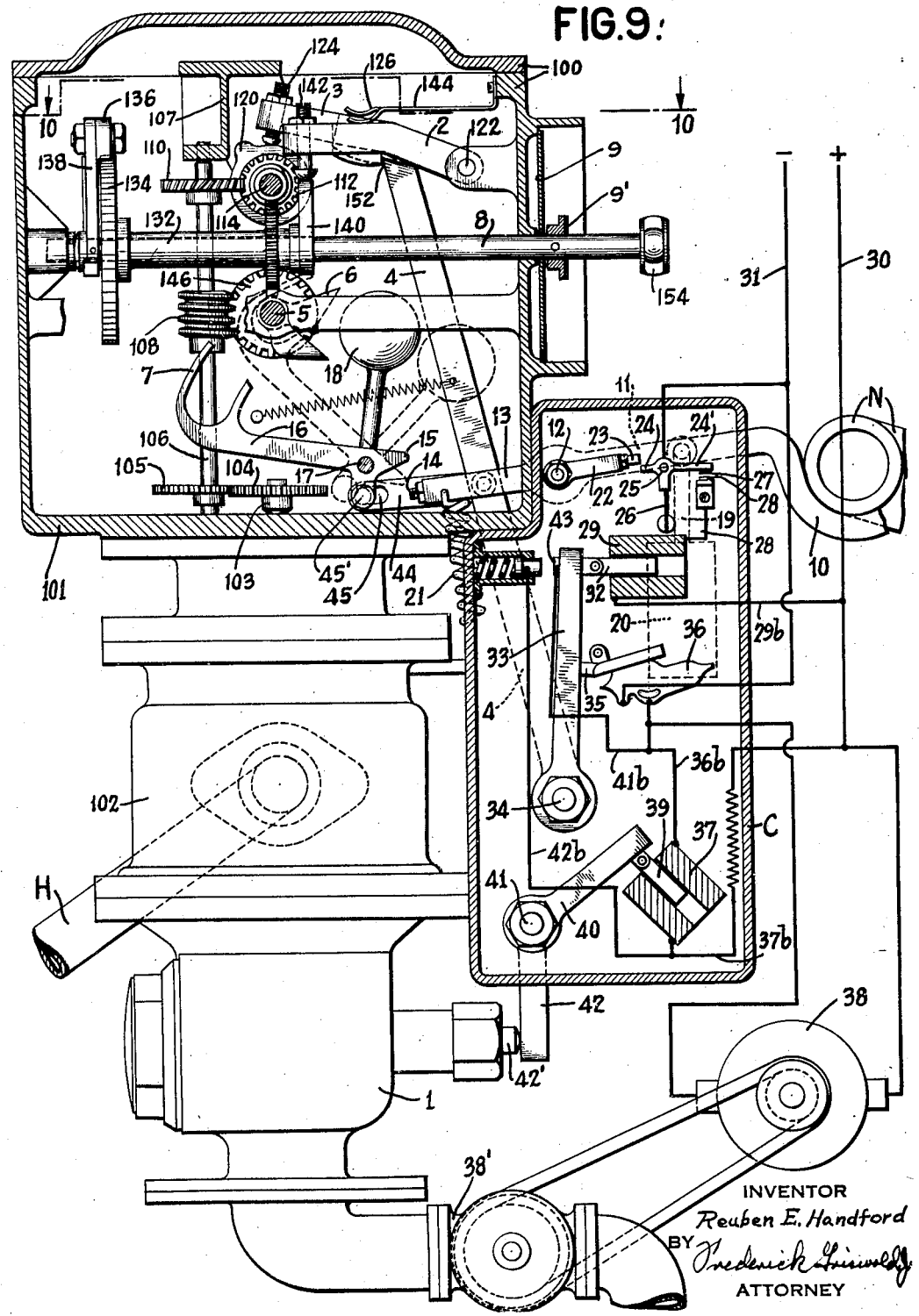

Oct. 6, 1936.    R. E. HANDFORD    2,056,923
APPARATUS FOR DELIVERING MEASURED QUANTITIES OF LIQUID
Filed Aug. 26, 1931    8 Sheets-Sheet 7

INVENTOR
Reuben E. Handford
BY
Frederick Griswold
ATTORNEY

Oct. 6, 1936.   R. E. HANDFORD   2,056,923
APPARATUS FOR DELIVERING MEASURED QUANTITIES OF LIQUID
Filed Aug. 26, 1931   8 Sheets-Sheet 8
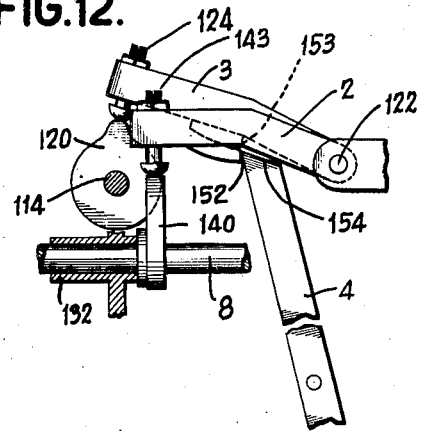
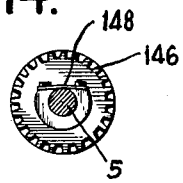
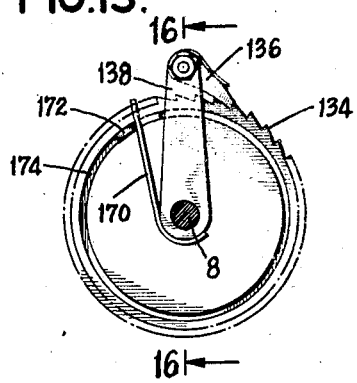
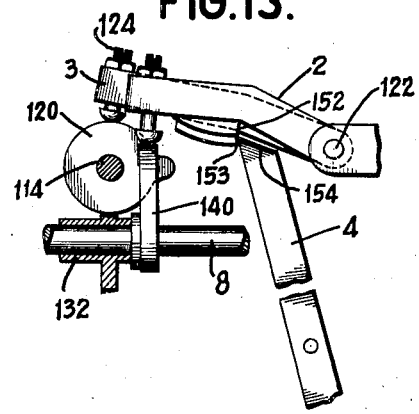
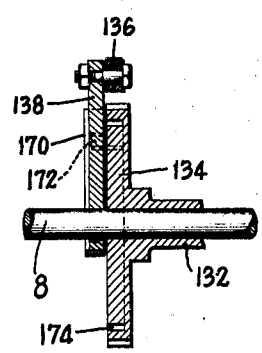
INVENTOR
Reuben E. Handford
BY
Frederick Griswold Jr.
ATTORNEY Patented Oct. 6, 1936

2,056,923

UNITED STATES PATENT OFFICE 2,056,923

APPARATUS FOR DELIVERING MEASURED QUANTITIES OF LIQUID

Reuben Ernest Handford, Luton, England, assignor, by mesne assignments, to L. N. S. Corporation, New York, N. Y., a corporation of Delaware Application August 26, 1931, Serial No. 559,552
In Great Britain August 5, 1931

47 Claims. (Cl. 221—101)

The main object of the present invention is to provide an arrangement, preferably an electric one, for automatically causing the various parts of an apparatus for delivering measured quantities of liquid to be set for delivering liquid upon the lifting of a delivery nozzle from a hook or the like on which it is normally supported.

Another object of the invention is to provide in an apparatus for delivering measured quantities of liquid, the combination of a discharge nozzle, a supporting member for supporting the discharge nozzle, an indicating device for indicating the quantity of liquid delivered, means for zeroizing the indicating device, means for establishing a flow of liquid to the apparatus, independently of the completion of operation of the zeroizing means, and means operable when the nozzle is moved from the support rendering operative the zeroizing means and the flow establishing means.

A further object resides in providing an apparatus for delivering measured quantities of liquid comprising a meter, an indicator driven by said meter proportional to the amount of liquid passed through said meter, means to force liquid through the apparatus, means for restoring said indicator to a predetermined position, a valve controlling the flow of liquid, and means operable to substantially simultaneously open said valve and operate said restoring means.

An additional object includes the provision in a liquid dispensing system having liquid forcing means, the combination therewith of a meter through which the liquid passes, an indicator driven by said meter proportional to the amount of liquid passed through said meter, means to maintain said indicator in indicating position after a dispensing operation, a valve controlling the passage of liquid and means to substantially simultaneously restore said indicator to zero and open said valve for a succeeding dispensing operation.

The invention is illustrated in the accompanying drawings as applied to an apparatus with which, among others, it may be conveniently used as, for example, the apparatus described and claimed in my copending application for Letters Patent for Liquid measuring apparatus, Serial Number 553,224, filed July 25, 1931 and corresponding British Patent Number 364,539.

In the drawings, Figure 1 is a sectional elevation and Figure 2 an end elevation of one form of construction; Figure 3 is a sectional elevation of a modified form of construction; and Figure 4 a sectional elevation of a further modified construction; and Figures 5 and 6 are detail views thereof. Figure 7 is a sectional elevation of a further modification, and Figure 8 is a wiring diagram illustrating the use of the mechanism shown in Figure 7.

Fig. 9 is a view in sectional elevation similar to Fig. 1 but with the nozzle in up position and the indicator in a different position from Fig. 1.

Figs. 12 and 13 are views of a detail of the apparatus showing two different positions.

Fig. 14 is a view in section along the lines 14—14 of Fig. 11, looking in the direction of the arrow.

Fig. 15 is a view of a detail of the pawl and ratchet mechanism, and

Fig. 16 is a view in section along the line 16—16 of Fig. 15.

Figure 11:
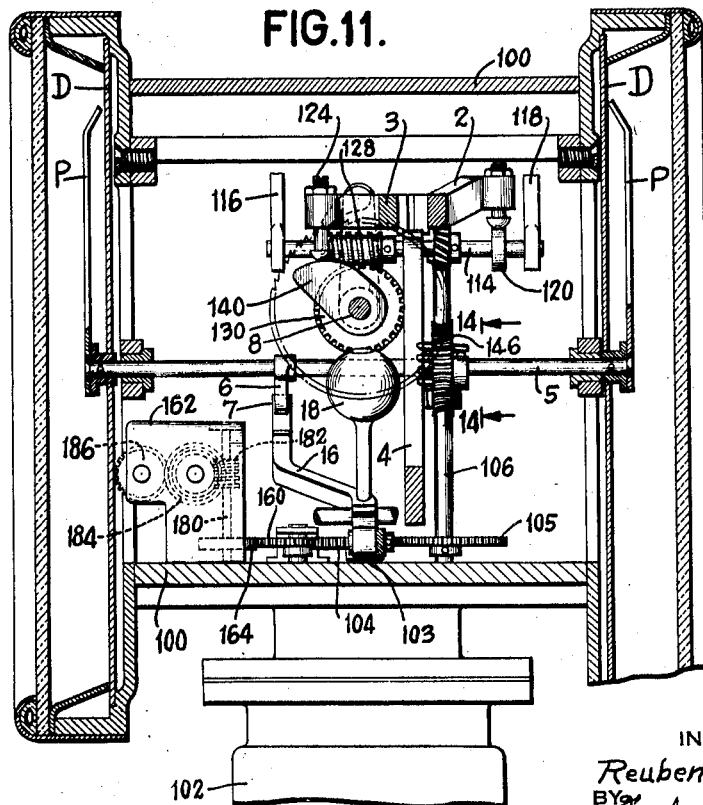
Fig. 11 is a view in section substantially along the line 11—11 of Fig. 10.

Referring more particularly to Figs. 1, 9, 10 and 11, the invention comprises various mechanisms which are conveniently assembled in a case member designated generally as 100. Attached to or adjacent the bottom 101 of the casing 100 is a meter 102 through which a flow of liquid is produced for example, by a pump 38' actuated by an electric motor 38. The pump 38' is in communication with the meter 102 by a conduit system including a valve 1. The flow established by the flow establishing means or pump 38' through the meter 102 which may be of rotary type produces a rotary motion of the shaft 103 to which is attached gear 104 in driving relation with another gear 105 fixed to a shaft 106 extending from bearings in the base member 101 to an auxiliary support 107 near the top of the case 100. Also keyed to the shaft 106 is a worm 108 and a skew or spiral gear 110. The skew gear 110 is in mesh with another skew gear 112 on a shaft 114 turning at right angles to the shaft 106 and journalled in supports 116 and 118 (Fig. 11; also Fig. 9). Also attached to the shaft 114 by a key or otherwise is a cam 120.

Pivoted at 122 on a portion of the casing 100 is a detent lever 3. At the end opposite the pivot 122 an adjustable stop or tappet 124 is provided that engages the cam 120. To urge the detent 3 against the cam 120 a spring member 126 is provided. A worm 128 is also keyed to the shaft 114 and meshes with a worm wheel 130 firmly attached to a sleeve 132 rotatable on the shaft 8. One end of the sleeve 132 is fixed to a ratchet 134 (Fig. 15) with which engages a pawl 136 on the pawl lever 138 firmly fixed to the shaft 8. Also fixed to the shaft 8 is a cam 140 which in a manner similar to cam 120 cooperates with an adjustable tappet 142 on a lever 2 likewise pivoted at 122 and urged against the cam by the spring member 144.

It will be evident that the parts just described, when driven from the meter 102 through the shaft or spindle 106 serve to rotate the cams 120 and 140 to raise the levers 2 and 3.

The spindle 106 and the worm 108 drive a worm gear 146 frictionally engaging the shaft 5 through a clutch member 148. (See Fig. 14.) On one or both ends of the shaft 5 projecting through the casing 100 are provided pointers P rotatable over dials D carrying suitable indicia indicative of the quantity of fluid or liquid dispensed.

Adjacent and somewhat below the casing 100 is an auxiliary compartment designated as C within which, on the shaft 34 is pivoted a lever 4 extending upwardly into the casing 100 to a position in cooperative relation with the detents 2 and 3. (See Figs. 12 and 13). To promote this cooperative relation between lever 4 and the detents 2 and 3 such detents are individually provided with shoulders 152 and 153 which engage the end 154 of the lever 4.

Suitable means hereinafter described tends to force the lever 4 in a counter-clockwise direction about the pivot 34 but this tendency is overcome when the lever 4 is moved in a clockwise direction a short distance so that the end of the lever 4, as at 154 is in engagement with the shoulders 152 and 153 of the detents 2 and 3.

Also attached to the shaft 5 in a rigid manner is a cam 6 adapted to cooperate with a forked member 7 hereinafter more completely described. The forked member 7 actuates the cam 6 in such a manner as to restore the indicator hands P to a predetermined, usually zero, position.

Figure 1:
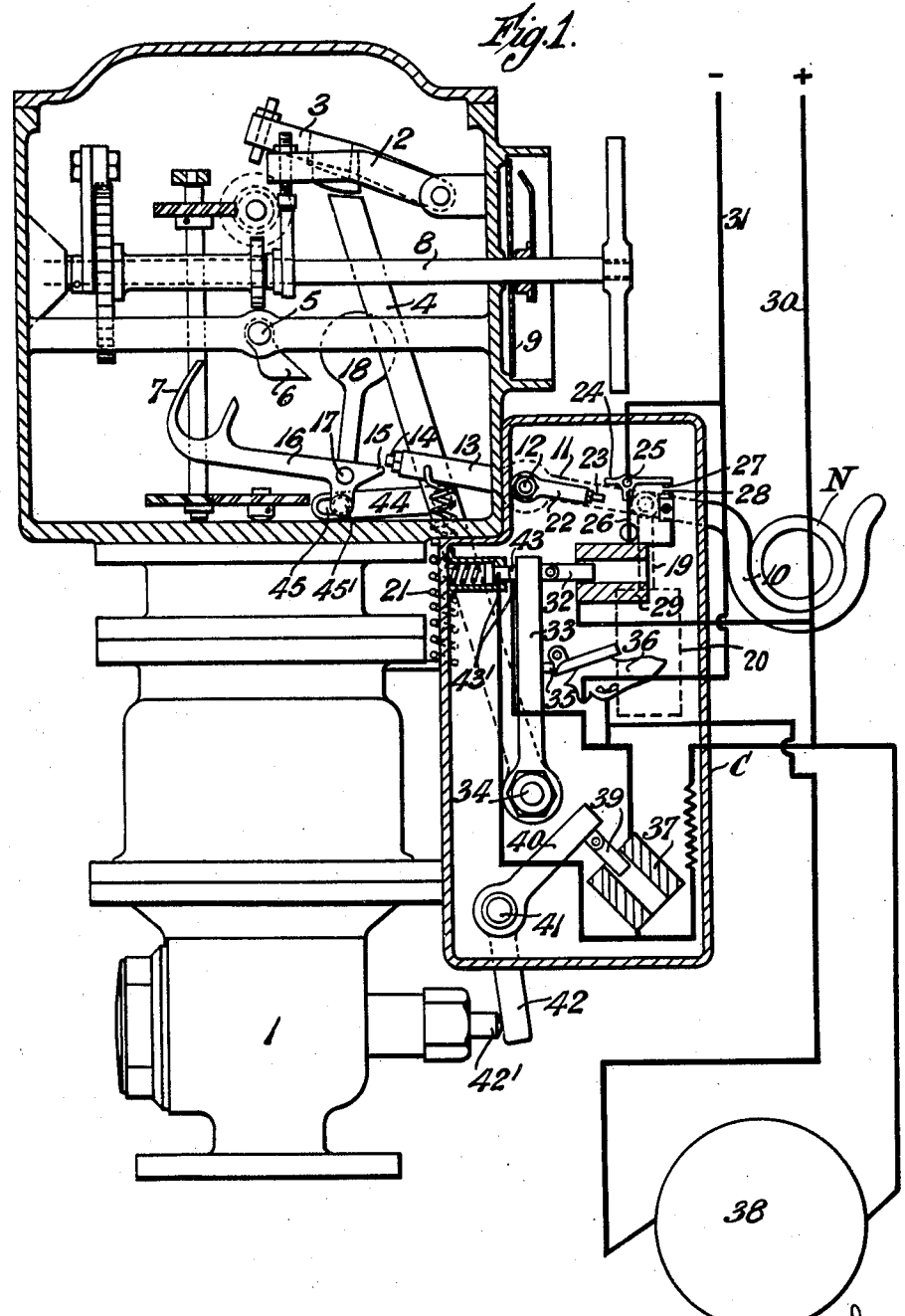
Figure 2:
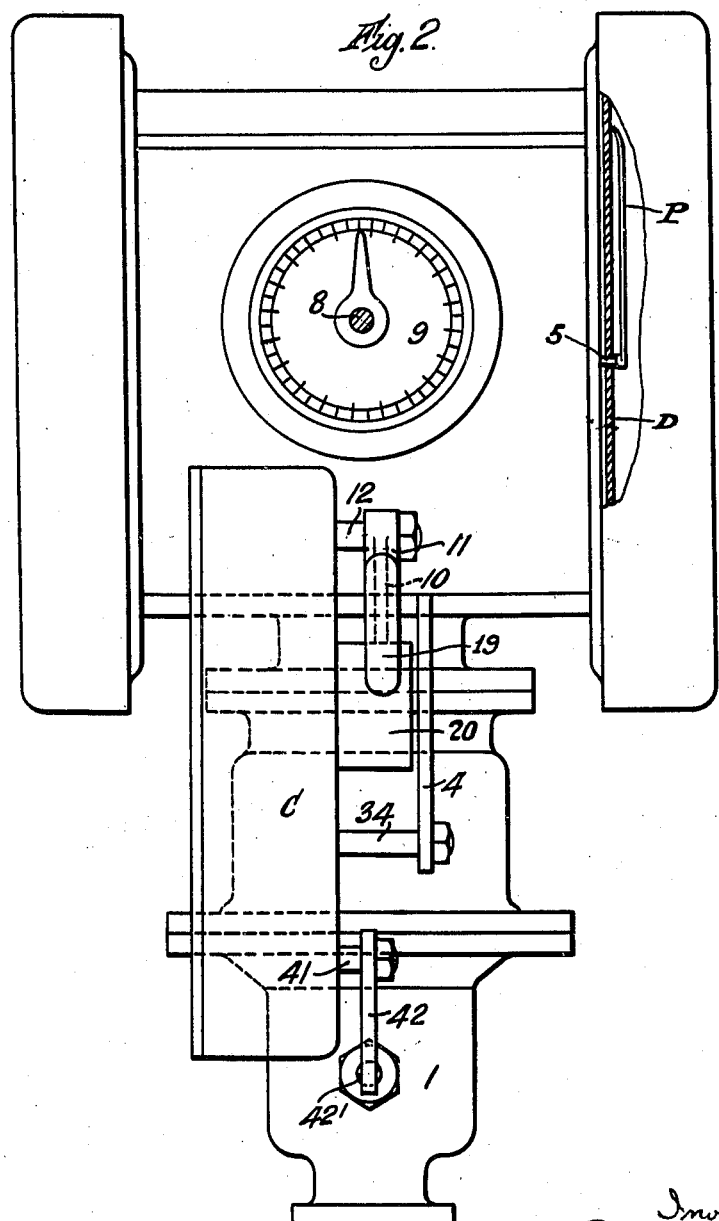

On the end of the shaft 8 may be provided a pointer 9' traveling over a dial 9. This dial 9 may be considered as a predeterminer dial and is conveniently provided with numerical indicia in a counter-clockwise progression as indicated in Fig. 2. At the extreme external end of the shaft 8 projecting from the casing 100 is attached a handle 154 through which the shaft 8 may be operated.

The parts thus far described may be operated according to the following procedure. The customer may designate the amount of liquid which he wishes to obtain in a particular transaction. The attendant then moves the pointer 9' by actuating the handle 154 on the end of the shaft 8 in a counter-clockwise direction until the pointer 9' shows on the dial 9 the amount desired. If no specific amount is designated the operator may rotate the handle 154 for substantially a complete revolution or any lesser distance that appears sufficient. This actuation of the shaft 8 causes a movement of the pawl lever 138 and the pawl 136 which slides over the teeth on the ratchet wheel 134 without moving it. At the same time the cam 140 on the shaft 108 is moved an amount corresponding to the movement of the pointer 9' from its initial position. The device is now put into operation by removing the nozzle N from the hook 10. This causes the lever 16 and fork 7 to be moved upwardly by the weight 18 to engage the cam 6 and rotates the shaft 5 to a position where the pointer P (see Figure 2) on the dial D shows an initial position, preferably zero. This can be accomplished because of the slip connection between the shaft 5 and the gear 146 as shown in Fig. 14 and comprising the friction clutch type of drive 148 whereby the shaft 5 can be moved independently of the gear 146. The movement of the nozzle N by means to be hereinafter described also results in bringing the lever 4 to the right where it is engaged by the detents 2 and 3. The valve 1 is also opened and flow of fluid produced by the pump 38' through the system results in actuation of the meter 102 and rotation of the shaft 103.

The shaft 103 through the spindle 106 and the skew gears 110 and 112 rotate the shaft 114. The gear ratio between the meter shaft 103 and the cam 120 is such that the cam 120 makes, for example, one complete revolution for each half gallon of liquid dispensed. Rotation of the cam 120 raises at one point of the rotation the detent 3 so that the shoulder 153 is out of the path of movement of the end 154 of the lever 4 and would therefore tend to release the lever 4 except for the fact that the shoulder 152 on the detent 2 is still in engagement with the end of the lever 4.

The shaft 114 (Fig. 11) through the worm 128 and worm wheel 130 rotates the sleeve 132 which through the ratchet wheel 134, pawl 136 and pawl lever 138 rotates the shaft 8 on which is fixed the cam 140 in cooperative relation with the tappet 142 on the detent 2. The gear ratio between the meter shaft 103 and the shaft 8 is such that the shaft 8 will make one complete revolution when, for example, twenty gallons of liquid have been dispensed and accordingly the cam 140 will likewise make one complete revolution for each twenty gallons. Assume that the pointer 9' has been originally set to indicate five gallons. This would require a rotation of the shaft 8 through an arc of 90° and would have moved the cam 140 through a quarter of a revolution. When the shaft 8 has been rotated for this quarter of a revolution, the high point on the cam 140 would be in engagement with the tappet 142 and raise the lever or detent 2 so as to disengage the shoulder 152 from the end 150 of the lever and would thus release the lever for movement in a counter-clockwise direction. The parts are so adjusted that the cam 140 will raise the detent 2 just prior to the time when the required amount of fluid has been delivered and thus will release the lever 4 when, say for example, the required quantity less about one-quarter of a gallon has been dispensed. At this point the raised portion of the cam 120 will not be in engagement with the tappet 124 and accordingly the detent 3 will be depressed by the spring 126 so that the lever 4, although free with reference to the detent 2, is still held by the detent 3 until the exact amount of the last unit or half unit has been delivered when the raised portion of the cam 120 will engage the tappet 124, raise the detent 3 and permit the lever 4 to move in a counter-clockwise direction sufficiently to actuate the mechanism hereinafter to be described, including the valve controlling lever and close the valve. If less than the amount originally designated by the customer satisfies his requirements the valve can be manually closed by turning the handle 154.

In order to insure that at the end of a presetting operation the pawl 136 shall be in engagement with a tooth on the ratchet wheel 134 and thereby prevent lag or loss in pickup to the drive, the arrangement shown more particularly in Figs. 15 and 16 is employed. Arm 138 is provided with a blade spring 170 which abuts at its free end against a blade spring 172 sprung into an annular recess 174 provided in the ratchet wheels 134. Thus when the spindle or shaft 8 is turned to preset the predeterminer the arm 138 first moves relatively to the blade spring 170 until the arm moves into definite engagement therewith, whereupon the arm moves the spring in the recess; during the time that the arm 138 moves relatively to the spring 172 the blade spring 170 is compressed, and if, at the end of the presetting operation, the pawl is not in contact with a tooth in the ratchet wheel the spring 172 moves the arm in the reverse direction until the pawl moves into engagement with a tooth and thereby prevents loss in pickup.

The meter shaft 103 driving gear 104 may also be employed to actuate another gear 160 that drives a counter mechanism designated generally as 162 through a gear system 164, shaft 180, worm 182 to a suitable system 184 that operates a recorder 186. The recorder may be visible through an opening in the dial D or provided at any other convenient point on the apparatus to show the total amount of liquid that has been sent through the apparatus.

In carrying out the present invention, the opening and closing of the cock or valve 1, the movement of the lever 4 against the action of its spring 4a, and the zeroizing of the pointers, are controlled preferably electrically when a nozzle N on the end of a hose H normally resting on a hook 10 is lifted to be inserted into the petrol tank of an automobile, for example.

This hook is formed on a lever 11 secured to a spindle 12 and extending at 13, the extended portion being provided with a projection 14 which is adapted to engage a nose 15 formed on an arm 16 on which the fork 7 is formed, the arm being pivotally mounted on a spindle 17. The spindle is provided with a weight 18 and the arrangement is such that if the arm 16 be rocked slightly in the clockwise direction from the position shown in the drawings, the system comprised of the arm 16 and weight 18 becomes unbalanced, the weight causing the arm to continue its movement rapidly and thereby causing the fork to engage the cam 6 and thereby to return the pointers to zero.

The lever 11 is pivotally connected to a rod 19 extending into a dashpot 20, and to the arm 13 is connected a spring 21 which is anchored to any convenient part of the casing. Thus, when the nozzle N is lifted from the hook 10, the spring causes the lever 11 to move in anti-clockwise direction at a rate which is controlled by the dashpot, and during the initial movement of the lever, the projection 14 thereon engages the nose 15 and thereby slightly rocks the arm 16 from the position shown, whereafter the weight 18 causes the arm 16 to continue its movement to effect zeroizing of the pointer.

The spindle 12 is extended through the wall of a flame-proof case C, and has secured to its end within the casing an arm 22 provided with a projection 23 which, after the projection 14 has engaged the nose 15, momentarily engages one arm of a switch lever 24 pivotally mounted at 25 and then, as the arm 22 continues its movement, leaves the lever, which latter is returned to its normal position by a centralizing spring 26. The lever 24 is provided with an electrical contact 27, which momentarily engages a contact 28 when the lever 24 is rocked by the projection 23; the two contacts, when closed, bring a solenoid 29 momentarily into circuit with supply lines 30, 31. The plunger 32 of the solenoid is pivotally connected to an arm 33 mounted on a spindle 34 which extends through the flame-proof casing C and is provided outside the casing with the lever 4. The arm 33 is provided with a projection 35 which, when the solenoid 29 is energized, moves into engagement with a mercury switch 36 which brings into circuit with the supply line a solenoid 37 and an electric motor 38 for driving a liquid forcing means more specifically illustrated as a pump 38' supplying liquid from any convenient reservoir to the apparatus. The plunger 39 of the solenoid 37 is connected to an arm 40 mounted on a spindle 41 which extends through the flame-proof case and has outside the case an arm 42 abutting against the projecting portion 42' of the cock spindle. Thus, when the solenoid 29 is energized, the lever 4 is moved in a clockwise direction and is retained in position by the detents 2, 3. The switch 36 closes the circuits of the solenoid 37 for opening the cock, and of the motor 38 for driving the pump 38', so that liquid is delivered to the apparatus. It will be noted that the operation of the pump 38' is started without physical dependence on completion of the operation of the zeroizing means. When the predetermined quantity of liquid (as set by the pre-setting spindle 8) has been delivered, the detents 2, 3 release the lever 4 in the manner described above and in said application Serial No. 553,224, and the switch 36 is rocked to open the circuit of the solenoid 37 and the motor 38, and thus the supply of liquid is discontinued. In order to effect a rapid de-energization of the solenoid 37 at this time, the arm 33 is provided with a stem 43 which, when the arm 33 returns to its normal position, bridges contacts 43' shunted across the solenoid. The lever 4 is provided with a link 44 having formed therein an elongated slot 45 into which extends a pin 45' on the lever 16, so that when the lever 4 is moved by the energization of the solenoid 29, the pin, being at this time at the end of the elongated slot, is moved and thus returns the fork 7 to the normal position, i. e. to a position from which it can be released to zeroize the pointers.

Figure 3:
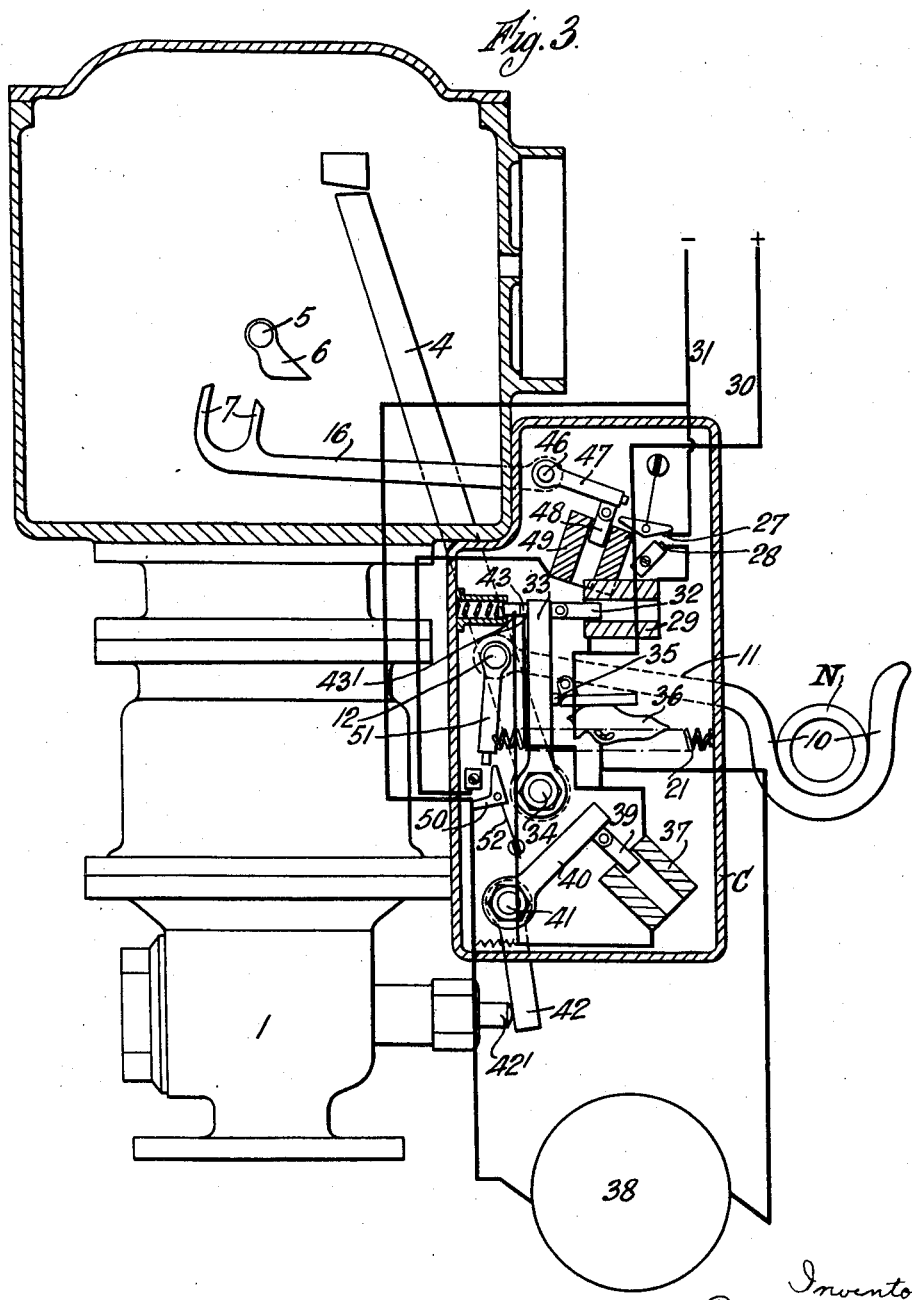

In the modification shown in Figure 3, the mechanical interconnection between the arm 13 and the lever 16 for effecting the actuation of the zeroizing fork 7 is replaced by an electrically operated apparatus. In this construction the lever 16 is mounted on a spindle 46 which extends through the flame-proof casing and is provided within the casing with an arm 47 having thereon the plunger 48 of a solenoid 49. The solenoid 49 is brought momentarily into circuit with the main supply line by a switch 50 which is closed by an arm 51 fast on the spindle 12 to which the hook is connected, the arm 51 only momentarily engaging the switch and thereafter leaving it to be returned to its normal position by a centralizing spring 52.

The switch comprising contacts 27, 28 for bringing the solenoid 29 which actuates the arm 33 into and out of circuit with the supply line, is, in this arrangement, actuated by the arm 47 when this latter has been actuated to zeroize the pointer and is returning to its normal position.

Figure 4:
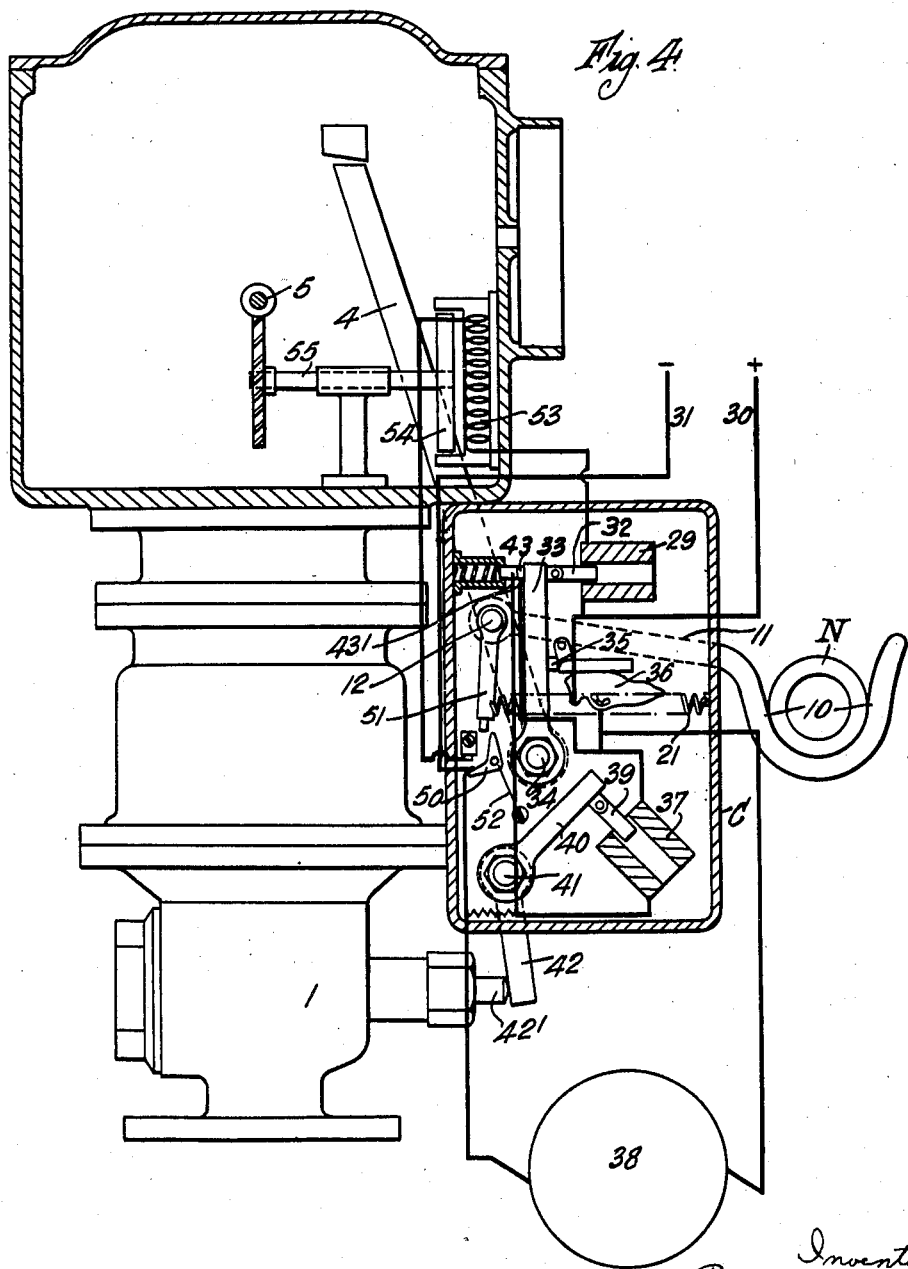
Figure 10:
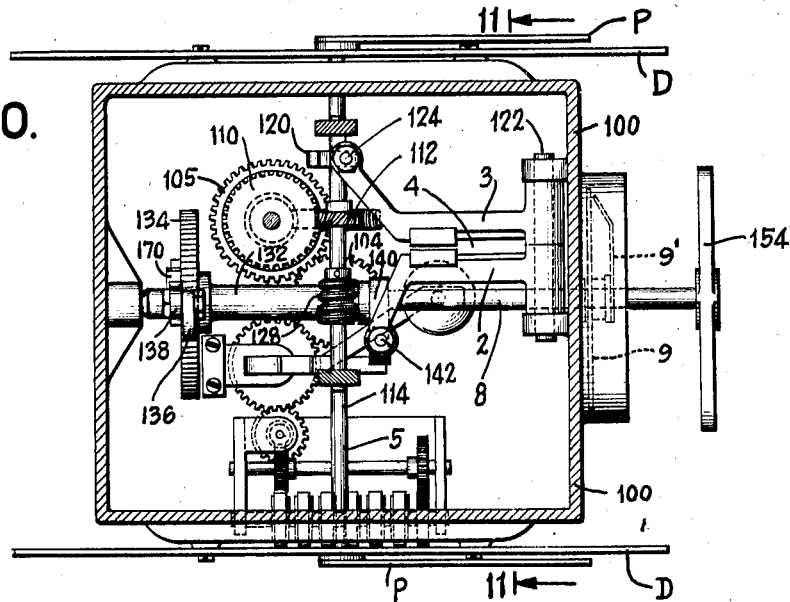
Fig. 10 is a view in section along the lines 10—10 of Fig. 9.

In the arrangement shown in Figures 4 to 6, the fork and the cam zeroizing mechanism is replaced by an electrical zeroizing mechanism which comprises an electromagnet 53 energized from main supply line under the control of the switch 50, and a polarized armature 54 fast with a spindle 55 and providing a skew or like reduction gear by means of which rotation of the spindle 55 can be transmitted to the spindle 5 on which the pointers are mounted; thus when the electromagnet 53 is energized by the closing of the switch 50, the armature thereof is moved, thereby effecting the rotation of the spindle to effect the zeroizing operation. As in the case of the apparatus shown in Figures 1 and 2, in the operation of the apparatus shown in Figure 4 the pump 38' is started without physical dependence on completion of the operation of the zeroizing means.

In the arrangement described above and in said specification No. 553,224, drive is transmitted from the meter to the pointers through a friction drive which enables the pointers to be zeroized independently of the drive thereto from the meter.

In order to eliminate the work which would be required from the electromagnet zeroizing arrangement shown in Figure 4, to overcome the friction of the friction drive, the friction drive is preferably replaced by an arrangement which, when the zeroizing operation is about to be effected, entirely and automatically disconnects the spindle 5 from the normal meter drive thereto. Such an arrangement is illustrated in Figures 7 and 8: the spindle 55 has as before a skew or reduction gear by means of which rotation of the spindle 55 can be transmitted to the spindle 5; the spindle 5 is, however, connected to the meter through a friction clutch device consisting of a sleeve 56 which is normally pressed by a spring 57 against a gear wheel 58 in mesh with a gear wheel 59 fast on a spindle 60 driven by the meter, the gear wheel 58 being pressed by the spring acting through the sleeve 56 against a collar 61 fast with the spindle 5, so that normally rotation of the gear wheel is accompanied by rotation of the spindle 5 and hence of the pointers. The sleeve 56 is, however, formed of soft iron and constitutes in effect the plunger of an electromagnet 62 which is included in circuit with the electro-magnet 53, so that, when the electromagnet is energized by the closing of the switch 58, the sleeve 56 is drawn to the right against the action of the spring 57; thus, the gear wheel 58 is freed from the collar 61 and the spindle 5 freed to turn independently of the gear wheel 59 and hence the meter.

It will be understood that in cases where the liquid to be delivered is caused to flow by a hand pump, by air or water pressure, by gravity or other liquid forcing means, an electric motor and pump would not be required, the apparatus in this case automatically performing the function of zeroizing the indicator and, if desired, of opening the cock.

It will also be understood that the invention is not limited to its application in the liquid measuring apparatus described and claimed in the copending applications Nos. 553,223 and 553,224 now Patent No. 2,052,530 dated Aug. 25, 1936.

What I claim is:—

1. In apparatus for delivering measured quantities of liquid, the combination of a discharge nozzle, a supporting member for supporting the discharge nozzle, an indicating device for indicating the quantity of liquid delivered, means for zeroizing the indicating device, means for establishing a flow of liquid to the apparatus substantially concurrently with the operation of the zeroizing means and irrespective of the completion of said latter operation, and means operable when the nozzle is moved from the support to operate the zeroizing means and the flow establishing means.

2. In apparatus for delivering measured quantities of liquid, the combination of a discharge nozzle, a supporting member for supporting a discharge nozzle, an indicating device for indicating the quantity of liquid delivered, electrically responsive means for zeroizing the indicating device, and means so controlling the circuit of the electrically responsive means that when the nozzle is moved from the support the said electrically responsive means is rendered operative.

3. In apparatus for delivering measured quantities of liquid, the combination of a discharge nozzle, a supporting member for supporting a discharge nozzle, an indicating device for indicating the quantity of liquid delivered, electrically responsive means comprising a circuit for zeroizing the indicating device, electrically responsive means comprising a circuit for establishing a flow of liquid to the apparatus substantially concurrently with the operation of the zeroizing means and irrespective of the completion of said latter operation and means so controlling the circuits of the said electrically responsive means that when the nozzle is moved from the support, the said electrically responsive means are rendered operative.

4. In apparatus for delivering measured quantities of liquid, the combination of a discharge nozzle, a supporting member for the nozzle, a member movable when the nozzle is removed from the support, an indicating device for indicating the quantity of liquid delivered, means for zeroizing the indicating device, means for establishing a flow of liquid to the apparatus substantially concurrently with the operation of the zeroizing means and irrespective of the completion of said latter operation, and means operated by the said movement of the movable member to operate the zeroizing and the flow establishing means.

5. In apparatus for delivering measured quantities of liquid, the combination of a discharge nozzle, a supporting member for the nozzle, a member movable when the nozzle is removed from the support, an indicating device for indicating the quantity of liquid delivered, electrically responsive means for zeroizing the indicator and means which are actuated by the said movement of the movable member and which so control the circuits of the electrically responsive means that the said means are rendered operative.

6. In apparatus for delivering measured quantities of liquid, the combination of a discharge nozzle, a support therefor, a movable member which is mounted for movement when the nozzle is removed from the support, an indicating device for indicating the quantity of liquid delivered, means for zeroizing the device, the said means being rendered operative by mechanical cooperation with the movable member, means for establishing a flow of liquid to the apparatus substantially concurrently with the operation of the zeroizing means and irrespective of the completion of said latter operation, electrically actuated motor means for rendering said establishing means operative, and switch mechanism which is included in the circuit of the electrically actuated means and is operated by the movable member when it is moved.

7. In apparatus for delivering measured quantities of liquid, the combination of a discharge nozzle, a supporting member for the nozzle, a member movable when the nozzle is removed from the support, an indicating device for indicating the quantity of liquid delivered, zeroizing means for the device comprising a member in drive connection with the device and a cooperating member, and means for establishing a flow of liquid to the apparatus substantially concurrently with the operation of the zeroizing means and irrespective of the completion of said latter operation, the said cooperating member and the flow establishing means being rendered operative by the said movement of the supporting member.

8. In apparatus for delivering measured quantities of liquid, the combination of a discharge nozzle, a supporting member for the nozzle, a member which is caused to move when the nozzle is removed therefrom, an indicating device, means for zeroizing the device comprising a member in operative connection with the device and a cooperating member which engages with the movable member to effect zeroizing and which is caused to be actuated by the movable member by the said movement thereof, flow establishing means initially operable substantially concurrently with the operation of the zeroizing means and irrespective of the completion of said latter operation, electrically responsive means for rendering the flow establishing means operative, and means which controls the circuit of the electrically responsive means and is operated by the movable member during the said movement thereof.

9. In apparatus for delivering measured quantities of liquid, the combination of a discharge nozzle, a supporting member for supporting a discharge nozzle, a movable member movable when the nozzle is removed from the support, an indicating device for indicating the quantity of liquid delivered, means for zeroizing the indicating device, means for establishing a flow of liquid to the apparatus, means operable when the nozzle is moved from the support rendering operative the zeroizing means and the flow establishing means, and means connected to said indicating means for automatically rendering the flow establishing means inoperative when the desired measured quantity of liquid has been delivered.

10. In apparatus for delivering measured quantities of liquid, the combination of a discharge nozzle, a movable supporting member for the nozzle which member moves when the nozzle is removed therefrom, an indicating device for indicating the quantity of liquid delivered, means for zeroizing the indicating device, means for establishing a flow of liquid to the apparatus, means operated by the said movement of the supporting member for rendering operative the zeroizing and the flow establishing means, and means connected to said indicating means for automatically rendering the flow establishing means inoperative when the desired measured quantity of liquid has been delivered.

11. In apparatus for delivering measured quantities of liquid, the combination of a discharge nozzle, a supporting member for supporting a discharge nozzle, an indicating device for indicating the quantity of liquid delivered, electrically responsive means for establishing a flow of liquid to the apparatus, means so controlling the circuits of the said electrically actuated means that when the nozzle is moved from the support, the said electrically responsive means are rendered operative, and additional means connected to said indicating means for so controlling the circuit of the means for establishing a flow of liquid that the said establishing means are rendered inoperative thereby discontinuing the supply of liquid when the desired measured quantity has been delivered.

12. In apparatus for delivering measured quantities of liquid, the combination of a discharge nozzle, a movable supporting member for the nozzle, which member is caused to move when the nozzle is removed therefrom, an indicating device for indicating the quantity of liquid delivered, means for zeroizing the device comprising a member in operative connection with the device and a cooperating member which engages with the last mentioned member to effect zeroizing and which is caused to be actuated by the supporting member by the said movement thereof, flow establishing means, electrically responsive means for controlling the flow establishing means, a first means operated by the supporting member during the said movement thereof and which controls the circuit of the electrically responsive means so as to render the flow establishing means operative, and a second means operable when the desired measured quantity has been delivered and for so controlling the circuit of the electrically responsive means as to render the flow establishing means inoperative to discontinue the supply of liquid.

13. In apparatus for delivering measured quantities of liquid, the combination of a discharge nozzle, a supporting member for the nozzle, which member is moved when the nozzle is removed therefrom, a device for indicating the quantity of liquid delivered, zeroizing means for the device including a member in drive connection with the device and a cooperating member mounted for movement to engage the first member, the said cooperating member being caused to move into zeroizing engagement with the first member by the movement of the supporting member, means for establishing a flow of liquid to the apparatus, an electromagnetic device for rendering said establishing means operative, a switch which is caused temporarily to close the circuit of the electromagnetic device by the movement of the supporting member and detent mechanism for holding the establishing means in operative position.

14. In apparatus for delivering measured quantities of liquid, the combination of a discharge nozzle, a supporting member for the nozzle, which member is moved when the nozzle is removed therefrom, a device for indicating the quantity of liquid delivered, zeroizing means for the device including two co-operating members the first in drive connection with the device and the second being caused to move into zeroizing engagement co-operative with the said first co-operating member by the movement of the supporting member, means for establishing a flow of liquid to the apparatus, an electromagnetic device for rendering said establishing means operative, a switch which is caused temporarily to close the circuit of the electromagnetic device by the movement of the supporting member, detent mechanism for holding the establishing means in operative position, and means for rendering the detent mechanism inoperative when the desired measured quantity of liquid has been delivered.

15. In apparatus for delivering measured quantities of liquid, the combination of a discharge nozzle, a supporting member for the nozzle, which member is moved when the nozzle is removed therefrom, a device for indicating the quantity of liquid delivered, zeroizing means for the device including a member in drive connection with the device and a cooperating member mounted for movement to engage the first member, the said cooperating member being caused to move into zeroizing engagement with the first member by the movement of the supporting member, means for establishing a flow of liquid to the apparatus, an electrically driven pump for delivering liquid to the apparatus, an electromagnetic device for rendering said establishing means operative, a switch which is caused temporarily to close the circuit of the electromagnetic device by the movement of the supporting member, a second switch for closing the circuit of the pump, detent mechanism for holding the establishing means in operative position and means for rendering the detent mechanism inoperative when the desired measured quantity of liquid has been delivered.

16. An apparatus for delivering measured quantities of liquid comprising a meter, an indicator driven by said meter proportional to the amount of liquid passed through said meter, means to force liquid through the apparatus, means for restoring said indicator to a predetermined position which when started in operation must be continued until restoration is complete, a valve controlling the flow of liquid, and means operable to substantially simultaneously open said valve and operate said restoring means.

17. An apparatus for delivering measured quantities of liquid comprising a meter, an indicator driven by said meter proportional to the amount of liquid passed through said meter, means to force liquid through the apparatus, means for restoring said indicator to a predetermined position which when started in operation must be continued until restoration is complete, an electromagnetically actuated valve controlling the flow of liquid, a circuit for said electromagnet, and means operable to actuate said restoring means and to substantially simultaneously energize said circuit to open said valve.

18. In a liquid dispensing apparatus having liquid forcing means, in combination, a meter through which the liquid passes, an indicator driven by said meter proportional to the amount of liquid passed through said meter, a discharge nozzle, a movable member retained in one position by the nozzle, means movable on the removal of said nozzle from said support to restore the indicator to zero which when started in operation must be continued until restoration is complete, a valve controlling the passage of liquid, means operable by said movement of said movable member to open said valve and permit the passage of liquid.

19. In a liquid dispensing apparatus having liquid forcing means, in combination, a meter through which the liquid passes, an indicator driven by said meter proportional to the amount of liquid passed through said meter, a discharge nozzle, a movable member retained in one position by the nozzle, means operated by the movement of said movable member to restore the indicator to zero which when started in operation must be continued until restoration is complete, a valve controlling the passage of liquid, an electrical circuit energized by the said movement of said movable member and means in the electrical circuit to open the valve and permit the passage of liquid.

20. In a liquid dispensing apparatus having liquid forcing means, in combination, a meter through which the liquid passes, an indicator driven by said meter proportional to the amount of liquid passed through said meter, a discharge nozzle, a movable member retained in one position by the nozzle, means operated by the movement of said member to restore the indicator to zero, a valve controlling the passage of liquid, means to hold said valve in closed position, means operable by said movement of said member to open said valve and permit the passage of liquid.

21. In a liquid dispensing apparatus having liquid forcing means, in combination, a meter through which the liquid passes, an indicator driven by said meter proportional to the amount of liquid passed through said meter, a discharge nozzle, a movable member retained in one position by the nozzle, means operated by the movement of said member to restore the indicator to zero which when started in operation must be continued until restoration is complete, a valve controlling the passage of liquid, means to hold the valve in closed position, means to hold the valve in open position, means to close the valve and means operable by said movement of said member to open said valve and permit the passage of liquid.

22. In a liquid dispensing apparatus having liquid forcing means, in combination, a meter through which the liquid passes, an indicator driven by said meter proportional to the amount of liquid passed through said meter, a discharge nozzle, a movable member retained in one position by the nozzle, means operated by the movement of said member to restore the indicator to zero which when started in operation must be continued until restoration is complete, a valve controlling the passage of liquid, means to open said valve and return said restoring means to operative position, and an electrical circuit energized by said movement of said member to operate said valve opening means.

23. In a liquid dispensing apparatus having liquid forcing means, in combination, a meter through which the liquid passes, an indicator driven by said meter proportional to the amount of liquid passed through said meter, means to maintain said indicator in indicating position after a dispensing operation, means for restoring said indicator to initial position which when started in operation must be continued until restoration is complete, a valve controlling the passage of liquid and means to substantially simultaneously operate said restoring means and open said valve for a succeeding dispensing operation.

24. In a liquid dispensing apparatus having liquid forcing means, in combination, a meter through which the liquid passes, an indicator driven by said meter proportional to the amount of liquid passed through said meter, means to maintain said indicator in indicating position after a dispensing operation, a valve controlling the passage of liquid, means to restore said indicator to zero, means to open said valve, and a movable nozzle support the movement of which on a succeeding dispensing operation actuates said restoring means and said valve opening means substantially simultaneously.

25. In a liquid dispensing apparatus having liquid forcing means, in combination, a meter through which the liquid passes, an indicator driven by said meter proportional to the amount of liquid passed through said meter, means to retain said indicator in the position to which it has been moved during a dispensing operation, a valve controlling the passage of liquid, means to restore said indicator to zero when started in operation must be continued until restoration is complete, means to open said valve and permit the passage of liquid, and means operable contemporaneously with the beginning of a subsequent dispensing operation to actuate said restoring means and valve opening means.

26. In a liquid dispensing apparatus, including liquid forcing means, a valve controlling the flow of liquid, a meter through which the liquid passes, an indicator driven by said meter proportional to the amount of liquid passed through said meter, and means acting automatically to reset said indicator upon the initiation of a succeeding liquid dispensing action, said resetting means including a flexible driving connection on the indicator shaft, a rigid cam-like member on said shaft, a forked member movable at right angles to the axis of rotation of said shaft and in alignment to act on said cam to effect the resetting of the indicator.

27. In a liquid dispensing apparatus, including liquid forcing means, a valve controlling the flow of liquid, a meter through which the liquid passes, an indicator driven by said meter proportional to the amount of liquid passed through said meter, and means acting automatically to reset said indicator upon the initiation of a succeeding liquid dispensing action, said resetting means including a flexible driving connection on the indicator shaft, a rigid cam-like member on said shaft, a forked member moving at right angles to the axis of rotation of said shaft and in alignment to act on said cam to effect the resetting of the indicator, said forked member having one arm longer than the other and being momentarily moved into cam-engaging position by a solenoid and being retracted therefrom upon the de-energizing of the solenoid.

28. In a liquid dispensing apparatus of the kind described, a motor adapted to be electrically driven, a pump actuated by said motor, a valve controlling the passage of liquid, measuring means and indicating means to measure and to indicate the quantity dispensed, mechanism associated with said indicating means to reset the same to zero, and an electrical switch and connections therefor to actuate the resetting devices, initiate operation of the motor and open the valve.

29. In a liquid dispensing apparatus of the kind described, a motor adapted to be electrically driven, a pump actuated by said motor, a valve controlling the passage of liquid, measuring means and indicating means to measure and to indicate the quantity dispensed, mechanism associated with said indicating means to reset the same to zero, a discharge nozzle, and a movable member retained in one position by the nozzle which movable member serves to actuate said resetting means, open the valve and initiate operation of the motor.

30. In a liquid dispensing apparatus of the kind described, liquid forcing means, a valve controlling the passage of liquid, measuring means and indicating means to measure and to indicate the quantity dispensed, mechanism associated with said indicating means to reset the same to zero, a discharge nozzle, and a movable member retained in one position by the nozzle and movable to actuate said resetting means and open the valve.

31. In apparatus for delivering measured quantities of liquid, the combination of a discharge nozzle, a supporting member for the nozzle, a member movable when the nozzle is removed from the support, an indicating device for indicating the quantity of liquid delivered, zeroizing means for the device comprising a member in drive connection with the device and a gravity actuated cooperating member, and means for establishing the flow of liquid to the apparatus independently of the completion of operation of the zeroizing means, the said cooperating member being displaced by the movable member and the flow establishing means being rendered operative by the said movement of the supporting member.

32. In apparatus for delivering measured quantities of liquid, the combination of a discharge nozzle, a supporting member for the nozzle, a member movable when the nozzle is removed from the support, an indicating device for indicating the quantity of liquid delivered, zeroizing means for the device comprising a member in drive connection with the device and a cooperating member, and means for establishing a flow of liquid to the apparatus substantially concurrently with the operation of the zeroizing means and irrespective of the completion of said latter operation comprising a valve in a liquid supply pipe line, the said cooperating member and the flow establishing means being rendered operative by the said movement of the supporting member.

33. In apparatus for delivering measured quantities of liquid, the combination of a discharge nozzle, a supporting member for the nozzle, a member which is caused to move when the nozzle is removed therefrom, an indicating device, means for zeroizing the device comprising a member in operative connection with the device and a cooperating member which engages with the movable member to effect zeroizing and which is caused to be actuated by the movable member by the said movement thereof, flow establishing means operable independently of the completion of operation of the zeroizing means, electrically responsive means for rendering the flow establishing means operative, and means which controls the circuit of the electrically responsive means and is operated by the movable member during the said movement thereof, said circuit controlling means including a switch which when actuated by the supporting member closes the circuit of an electro-magnetic device for rendering the flow establishing means operative.

34. In apparatus for delivering measured quantities of liquid, the combination of a discharge nozzle, a movable supporting member for the nozzle which member moves when the nozzle is removed therefrom, an indicating device for indicating the quantity of liquid delivered, electrically responsive means for zeroizing the indicator, means which are actuated by the said movement of the supporting member and which so control the circuits of the electrically responsive means that the said zeroizing means are rendered operative, flow establishing means, electrically responsive means for rendering the flow establishing means operative, and additional means for so controlling the circuit of the flow establishing means that the said flow establishing means are rendered inoperative, thereby discontinuing the supply of liquid when the desired measured quantity has been delivered.

35. In apparatus for delivering measured quantities of liquid, the combination of a discharge nozzle, a supporting member for supporting the discharge nozzle, an indicating device for indicating the quantity of liquid delivered, means for zeroizing the indicating device, valve means for establishing a flow of liquid to the apparatus and means movable in a predetermined path when the nozzle is moved from the support rendering operative, during its movement in said path, the zeroizing means the valve means to establish a flow of liquid.

36. In apparatus for delivering measured quantities of liquid, the combination of a discharge nozzle, a supporting member for supporting the discharge nozzle, an indicating device for indicating the quantity of liquid delivered, means for zeroizing the indicating device, means for establishing a flow of liquid to the apparatus and means movable in a predetermined path when the nozzle is moved from the support rendering operative, during its movement in said path, the zeroizing means and the flow establishing means, one of said means being rendered operative before the other of said means.

37. In a liquid dispensing system, in combination, a conduit, a valve in said conduit, a delivery hose terminating in a nozzle, a pump, an electric motor for driving the pump, a switch through which the motor may be energized, a liquid meter for measuring the liquid dispensed, a resettable indicator driven by said meter having a predetermined initial position, means for supporting the nozzle, means operable when the nozzle is removed from its support to close the switch, energize the motor, open the valve and restore the indicator to its predetermined position.

38. In liquid dispensing apparatus, in combination, a delivery hose having a nozzle, a support for the nozzle, liquid metering means, means to establish liquid flow through the metering means, valve means to control the flow of liquid, indicating means movable by the metering means from an initial position in proportion to the amount of liquid passed through the metering means, means to restore the indicating means to initial position, and means released by the removal of the nozzle from the support to actuate the restoring means, energize the flow establishing means, and open the valve means.

39. In a liquid dispensing apparatus having a motor driven pump, a switch therefor, a conduit to which the pump delivers liquid, valve means in said conduit, control means for said valve, indicating devices to register the quantity dispensed, and means to maintain said devices in indicating position when the motor is de-energized, and to reset said devices to zero during the action of again starting the motor pump, said resetting action being accomplished during the movement of the valve control means and the motor starting switch.

40. In liquid delivery apparatus, the combination, with a flow establishing means, of a meter and an indicator having associated resetting mechanism, valve means for controlling the flow through the meter, actuating means to open and close said valve means, and means operatively associated with said valve actuating means and the resetting mechanism whereby in a valve opening movement the actuating means and the resetting mechanism may operate synchronously to insure complete actuation of the resetting mechanism and permit flow of liquid in a succeeding transaction.

41. In a fluid dispensing device, the combination of a fluid delivery line, fluid forcing means associated with said line, valve means in said line selectively conditionable to open and close the fluid delivery line, flow responsive apparatus associated with the line, an indicator actuated by the flow responsive apparatus, resetting mechanism for the indicator, and means operatively associated with the resetting mechanism and the valve means whereby to reset the indicator and open the fluid delivery line when the fluid forcing means is started in operation.

42. In a fluid dispensing device, in combination, a meter having a resettable indicator adapted to be actuated in response to fluid flowing through the meter, valve means operable to control the flow of fluid through the meter, and means operatively associated with the valve means to retain the indicator in position indicating the amount dispensed after the fluid flow has stopped and to reset the indicator automatically as and when the flow is again started by opening the valve means.

43. In a liquid delivery apparatus, the combination of a meter having associated resetting mechanism, a delivery hose connected to said meter, means to cause a flow of fluid to be dispensed through said meter and hose, a support for the hose when not in use, valve means controlling the flow of fluid, means to open said valve means when the nozzle is removed from its support and operating means for said resetting mechanism, said operating means being rendered inoperative while the hose is on its support.

44. In a liquid delivery apparatus, the combination of a meter having associated resetting mechanism, a delivery hose connected to said meter, fluid forcing means to deliver fluid to said meter and hose, valve means for controlling the delivery of fluid through said hose, a support for the hose when not in use, and operating means for said resetting mechanism, said operating means and said valve means being rendered inoperative to reset and permit the passage of liquid respectively while the hose is on its support.

45. A liquid dispensing apparatus, comprising means for establishing a flow of liquid, valve means controlling the flow, an indicator responsive to said flow displaying progressive indicia indicating the quantities dispensed in a given operation, instrumentalities for restoring said indicator to an initial position displaying the initial indicia and for preventing the display of progressive indicia in a succeeding operation until the initial indicia has been so displayed, and means cooperatively associated with the valve and the indicator to insure opening of the valve as the indicator is restored to display the initial indicia.

46. A liquid dispensing apparatus comprising means for establishing a flow of liquid, valve means controlling the flow, an indicator responsive to said flow displaying progressive indicia indicating the quantities dispensed in a given operation, instrumentalities for restoring said indicator to an initial position displaying the initial indicia and for preventing the display of progressive indicia in a succeeding operation until the initial indicia has been so displayed, and means cooperatively associated with the valve and the indicator to insure concomitant opening actuation of said valve and restoring of said indicator.

47. A liquid dispensing apparatus comprising means for establishing a flow of liquid, valve means controlling the flow, an indicator responsive to said flow displaying progressive indicia indicating the quantities dispensed in a given operation, instrumentalities for restoring said indicator to an initial position displaying the initial indicia and for preventing the display of progressive indicia in a succeeding operation until the initial indicia has been so displayed, and means cooperatively associated with the valve and the indicator to insure concomitant correlative change in said valve and indicator.

REUBEN ERNEST HANDFORD.

CERTIFICATE OF CORRECTION.

Patent No. 2,056,923.  October 6, 1936.

REUBEN ERNEST HANDFORD.

It is hereby certified that error appears in the printed specification of the above numbered patent requiring correction as follows: Page 7, second column, line 71, claim 35, after "means" first occurrence, insert and; and that the said Letters Patent should be read with this correction therein that the same may conform to the record of the case in the Patent Office.

Signed and sealed this 8th day of December A. D. 1936.

Henry Van Arsdale
Acting Commissioner of Patents.

(Seal)